May 13, 1930.  W. F. BROMM  1,758,780
METHOD OF MAKING STONE PLANER TOOLS
Filed Oct. 11, 1926
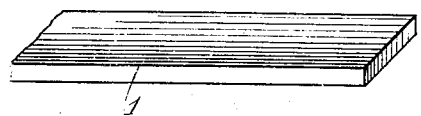
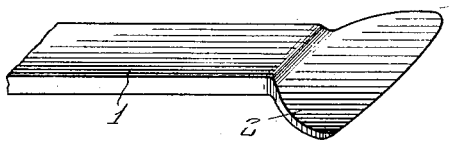
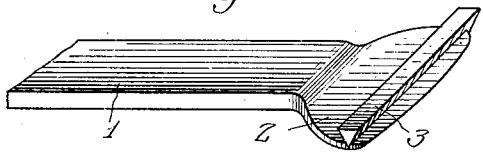
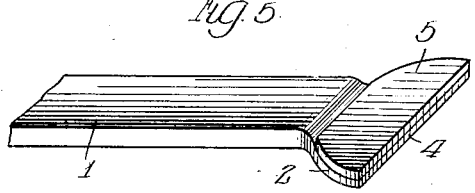
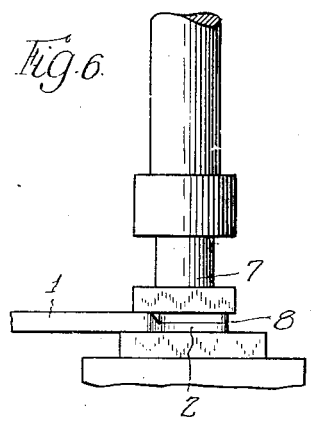
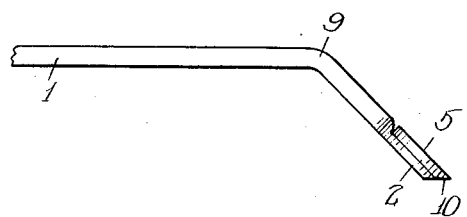
Inventor:
William F Bromm,
By Kent W. Nourell Atty.

Patented May 13, 1930

1,758,780

UNITED STATES PATENT OFFICE

WILLIAM F. BROMM, OF CHICAGO, ILLINOIS

METHOD OF MAKING STONE-PLANER TOOLS

Application filed October 11, 1926. Serial No. 140,717.

This invention relates to a planer tool having a side cut and particularly designed for trimming, cutting or dressing stone by means of a planer.

The principal object of the invention is to provide a tool of this kind which has a shank of sufficient size to support the tool with a somewhat wider cutting plate, provided with a cutting edge made not of the ordinary low carbon steel, but with a backing and shank of low carbon steel and a cutting edge of so-called high speed steel welded thereto under high pressure and under the action of a soldering flux.

In the accompanying drawing:

Figure 1 illustrates a strip or bar of ordinary steel of which the shank of the tool is made;

Figure 2 illustrates the bar of Figure 1 fullered out or widened at one end;

Figure 3 illustrates the method of trimming or cutting the outer edge of the battered portion of the tool;

Figure 4 shows the tool with the outer edge cut off;

Figure 5 illustrates the application of a piece of high speed steel, substantially conforming in shape to the battered portion of the shank;

Figure 6 is a diagrammatic representation of the application of pressure to press the high speed strip in a close welding contact with the ordinary steel shank; and Figure 7 illustrates the formed tool in its final shape.

Referring now more particularly to the drawings, a strip or bar 1 of ordinary low carbon steel is heated at one end to a forging temperature below the welding point, and this end 2 fullered or forged by hand or machine until it is flattened out evenly beyond the sides of the shank and at a decreased thickness. This fullered end 2 is somewhat irregular in shape due to the flattening action, and while it is still hot, the outer edge is trimmed with a straight knife 3 to form the straight edge 4 as seen in Figure 4.

This makes a broadened flat extremity thinner than the original bar 1 and to this flattened portion is applied a piece or strip 5 of high speed steel, which is capable of cutting metal and stone at high speed without rapid deterioration of the cutting edge.

The method of application of the high speed strip 5 is to heat the flattened portion 2 and the strip 5 to a welding temperature, preferably in a gas furnace which can be accurately controlled and then to place these parts together in the position shown in Figure 5, in a hydraulic press 7, as represented in Figure 6, a welding flux 8 being first interposed between the flattened portion 2 and the high speed strip 5 so that upon the application of pressure, a smooth firm joint and union will be made between the adjacent surfaces of the flattened portion 2 and the strip 5. In practice the joint obtained by the application of pressure is so close and firmly united that when the edges are ground to the proper shape, it is difficult if not impossible to find the line of union of the two parts.

After the high speed strip is welded in place, the shank 1 is formed with a bend 9 adjacent the cutting end and the extremity is ground to present a cutting edge or point 10, as indicated in Figure 7.

Tools of this kind are particularly adapted for use in trimming or dressing stone and are used in planers for this purpose to take the place of a great many smaller cutters for doing the same work. As a matter of fact, this tool does better work because it makes a more even cut, it is practically impossible to distort or destroy any portion of the cutting edge without damaging the whole tool; whereas in the case of several small tools for accomplishing the same result, the breaking or bending of one tool might destroy or damage another piece.

It is obvious that in addition to cutting stone a tool of this kind is capable of many uses wherever applicable.

I claim:

1. The method of making a high speed tool with a low carbon holder which consists in broadening and flattening one end of a bar of low carbon steel, in welding thereto under pressure a thin piece of high speed steel which extends the full width of the flattened portion, and in bending and grinding the edge so that the high speed steel is backed and supported by the low carbon material for the full length of the cutting edge.

2. The method of making a high speed tool with a low carbon holder which consists in forging one end of a low carbon bar to flatten and widen the extremity thereof, in cutting off the extremity of the flattened end, in applying to the end a similarly shaped thin piece of high speed steel, and in welding the strip and the flattened portion together under the application of pressure.

3. The method of making a high-speed tool with a low carbon holder which consists in forging one end of a low carbon bar to flatten and widen the extremity thereof, in cutting off the extremity of the flattened end, in applying to the end a similarly shaped thin piece of high-speed steel, and in attaching the strip and flattened portion together.

WILLIAM F. BROMM.